US009617776B2

(12) United States Patent
Farrell et al.

(10) Patent No.: US 9,617,776 B2
(45) Date of Patent: Apr. 11, 2017

(54) MOTOR DRIVEN DOOR ASSEMBLY

(75) Inventors: David P. Farrell, Gilbertsville, PA (US); Robert J. Farrell, Perkiomenville, PA (US)

(73) Assignee: VERITAS MEDICAL SOLUTIONS LLC, Malvern, PA (US)

( * ) Notice: Subject to any disclaimer, the term of this patent is extended or adjusted under 35 U.S.C. 154(b) by 302 days.

(21) Appl. No.: 13/075,704

(22) Filed: Mar. 30, 2011

(65) Prior Publication Data

US 2011/0245978 A1 Oct. 6, 2011

Related U.S. Application Data

(60) Provisional application No. 61/319,718, filed on Mar. 31, 2010.

(51) Int. Cl.

| | |
|---|---|
| ***E05F 15/04*** | (2006.01) |
| ***G05B 15/02*** | (2006.01) |
| ***E05F 15/614*** | (2015.01) |
| ***E06B 7/36*** | (2006.01) |

(52) U.S. Cl.

CPC ............ *E05F 15/614* (2015.01); *E06B 7/367* (2013.01); *E05Y 2201/11* (2013.01); *E05Y 2800/262* (2013.01); *E05Y 2900/132* (2013.01)

(58) Field of Classification Search

CPC ............. E05F 15/614; E05Y 2900/132; E05Y 2201/11; E05Y 2800/262; E06B 7/367

USPC .................... 700/275; 49/334, 340, 349, 358

See application file for complete search history.

(56) References Cited

U.S. PATENT DOCUMENTS

| | | | | | |
|---|---|---|---|---|---|
| 2,093,966 | A | * | 9/1937 | Hodgson | 16/355 |
| 2,800,323 | A | * | 7/1957 | West et al. | 49/32 |
| 3,139,046 | A | | 6/1964 | Graber et al. | |
| 3,629,973 | A | * | 12/1971 | Bond | E05F 15/53 49/244 |
| 3,675,370 | A | * | 7/1972 | Catlett | E05D 15/30 49/141 |
| 3,820,282 | A | * | 6/1974 | Kornylak | 49/255 |
| 4,441,376 | A | | 4/1984 | Tobey | |
| 5,219,386 | A | * | 6/1993 | Kletzmaier et al. | 70/277 |
| 5,369,912 | A | * | 12/1994 | Ginzel et al. | 49/141 |
| 5,488,660 | A | * | 1/1996 | Dawson et al. | 713/182 |
| 5,634,296 | A | * | 6/1997 | Hebda | E05F 15/63 49/28 |

(Continued)

FOREIGN PATENT DOCUMENTS

| | | | |
|---|---|---|---|
| EP | 1188893 | A1 | 3/2002 |
| EP | 1223285 | A2 | 7/2002 |
| EP | 2071113 | A1 | 6/2009 |

OTHER PUBLICATIONS

Extended European Search Report issued in corresponding European Patent Application No. 11160604 on Jun. 20, 2014, consisting of 7 pp.

*Primary Examiner* — Charles Kasenge
(74) *Attorney, Agent, or Firm* — Volpe and Koenig, P.C.

(57) ABSTRACT

A motor driven door assembly is provided, the motor driven door assembly includes a door frame, a motor assembly connected to the door frame and having a motor directly connected to a first portion of a door hinge, and a door connected to the door hinge. The door hinge includes a second portion supported by a bearing assembly that carries substantially all of the door's weight, and the motor directly drives the door hinge to open or close the door.

18 Claims, 11 Drawing Sheets

(56) References Cited

U.S. PATENT DOCUMENTS

| | | | | |
|---|---|---|---|---|
| 5,930,954 | A * | 8/1999 | Hebda | E05F 15/63<br>49/28 |
| 6,481,160 | B1 * | 11/2002 | Kowalczyk | 49/335 |
| 6,634,140 | B1 * | 10/2003 | Sellman | 49/340 |
| 6,825,753 | B2 * | 11/2004 | Cardinale et al. | 340/5.73 |
| 6,874,331 | B2 * | 4/2005 | Chandler et al. | 62/256 |
| 7,310,911 | B1 * | 12/2007 | Sellman | 49/340 |
| 7,367,161 | B1 | 5/2008 | Jones | |
| 7,418,800 | B1 * | 9/2008 | Sellman | 49/340 |
| 7,448,173 | B2 * | 11/2008 | Brisbois | E06B 3/7001<br>248/228.1 |
| 7,641,106 | B1 * | 1/2010 | Kovacs et al. | 235/379 |
| 8,169,317 | B2 * | 5/2012 | Lemerand | E05F 15/70<br>340/521 |
| 8,205,387 | B2 * | 6/2012 | Ranaudo | E05B 65/08<br>49/141 |
| 8,225,458 | B1 * | 7/2012 | Hoffberg | 16/49 |
| 2003/0005639 | A1 * | 1/2003 | Kowalczyk | 49/340 |
| 2003/0090364 | A1 * | 5/2003 | Cardinale et al. | 340/5.54 |
| 2005/0223645 | A1 * | 10/2005 | Ericsson et al. | 49/339 |
| 2007/0113495 | A1 * | 5/2007 | Roberts | E04B 2/7425<br>52/202 |
| 2007/0186479 | A1 * | 8/2007 | Ho | E05F 15/614<br>49/342 |
| 2008/0250716 | A1 * | 10/2008 | Ranaudo | E05D 15/58<br>49/31 |
| 2010/0242366 | A1 * | 9/2010 | Liebscher | E05D 15/58<br>49/142 |
| 2011/0113692 | A1 * | 5/2011 | Stamper | 49/334 |
| 2011/0174199 | A1 * | 7/2011 | Pendleton et al. | 109/59 R |

* cited by examiner

MOTOR DRIVEN DOOR ASSEMBLY

CROSS REFERENCE TO RELATED APPLICATION

This application claims the benefit of U.S. Provisional Patent Application Ser. No. 61/319,718, filed Mar. 31, 2010, which is incorporated by reference as if fully set forth herein.

FIELD OF INVENTION

This application is generally related to doors and more particularly related to a motor driven door assembly.

BACKGROUND

Motor driven door assemblies are used in many applications, and are especially useful where the door's weight or position makes it difficult for a user to manually open and close the door. Known motor driven door assemblies generally arrange the motor at the top of the door, where a drive shaft of the motor is connected to the door through an arm configured to move along the draft shaft. As the drive shaft rotates about an axis perpendicular to the axis of rotation of the door's pivot, the arm's translation motion along the drive shaft causes the door to rotate about its pivot. However, in such an arrangement, the top mounted motor and arm assembly are in plain view, which is undesirable for aesthetic reasons. In addition, the exposed motor and arm assembly take up space above the door, are more prone to damage and dirt buildup, and may present a safety hazard. FIG. 10 shows an example of a prior art door assembly 100, which is mounted in a door frame 102 between adjacent walls 104. A top mounted motor 106 includes a drive shaft 108 that rotates about an axis X, which is perpendicular to an axis Y about which the door 110 rotates. As the drive shaft 108 of the motor 106 rotates, a transmission element 114 moves along the drive shaft 108 and coverts the rotary motion of the motor 106 to actuate an arm 116 that drives the door 110 open or closed about its rotational axis Y. While such a top mounted motor and arm assembly may be sufficient for non-commercial or light weight doors, its effectiveness decreases for heavier doors such as those used in medical radiation treatment rooms, which require special shielded doors that typically weigh 10,000-20,000 lbs, and up to 200,000 lbs.

Other known motor driven door assemblies require the motor to be firmly secured within the room's cement foundation or ceiling. Such known assemblies have the disadvantage that the motor assembly must be installed at the time the foundation or ceiling material (such as cement) is set, or the foundation or ceiling material must be removed and re-set if the motor is installed after the room is initially built.

A need exists for a motor driven door assembly that is suitable for use with heavy doors, does not require the use of a top mounted motor and arm, alleviates the problems associated with exposed motors and hinges, and can be easily installed without removal and re-pouring of the foundation or ceiling cement.

SUMMARY

A motor driven door assembly is disclosed. The motor driven door assembly has a door frame, a motor assembly connected to the door frame and having a motor directly connected to a first portion of a door hinge, and a door connected to the door hinge. The door hinge has a second portion supported by a bearing assembly that carries substantially all of the door's weight, and the motor directly drives the door hinge to open or close the door. The door hinge may include a bottom hinge and a separate top hinge. The motor may be connected to the bottom hinge, and the top hinge may rotate about a bearing assembly mounted to a ceiling of the door frame.

A motor driven door assembly for installation in an existing entryway is also disclosed. The motor driven door assembly includes a motor having a drive shaft that rotates about a vertical axis, a door having a hinge connected to the drive shaft, and a first access panel arranged adjacent to the door outside of the entryway, and a second access panel arranged adjacent to the door inside of the entryway opposite from the first access panel. The first and second access panels are movable and conceal the motor and hinge during operation of the door.

A floor mounted motor driven door assembly is also disclosed. The floor mounted motor driven door assembly has a door frame and a motor assembly connected to the door frame. The motor assembly has a motor with a rotating drive shaft. The floor mounted motor driven door assembly further includes a door having a hinge directly connected to the rotating drive shaft, a bearing assembly that supports a lower end of the hinge and is mounted flush with a floor on which the floor mounted motor driven door assembly is installed, and a movable access panel arranged between and connected to one of the door and a side of the doorframe to conceal the motor assembly and hinge during operation of the door. The door is directly driven by the rotating drive shaft as the door pivots about the hinge between a closed position and an open position, without use of any intervening components between the rotating drive shaft and the hinge.

For sake of brevity, this summary does not list all aspects of the present invention, which are described in further detail below.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION OF THE PREFERRED EMBODIMENTS

Figure 1:
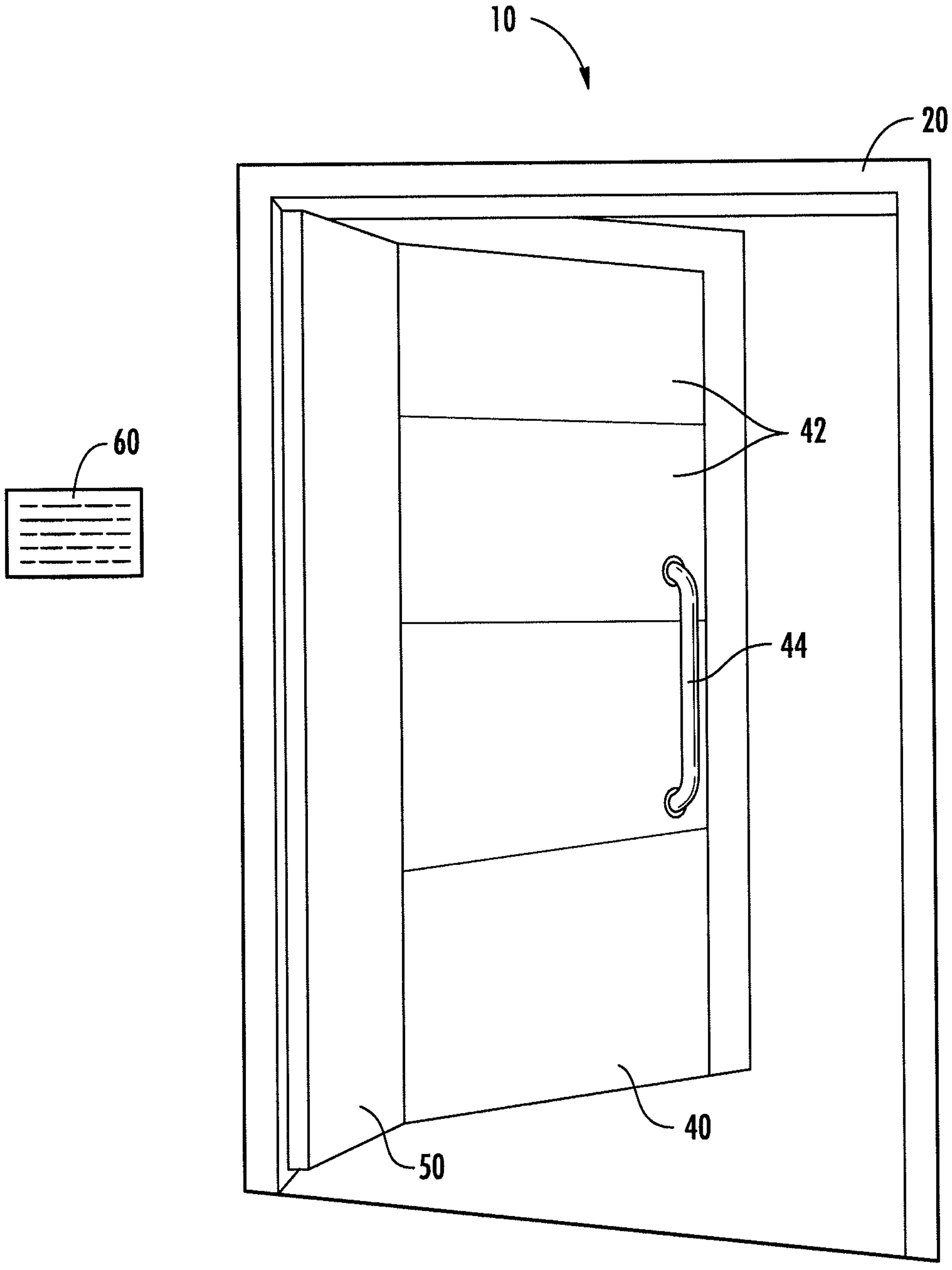
FIG. 1 is a perspective view of an embodiment of the motor driven door assembly.

Certain terminology is used in the following description for convenience only and is not limiting. The words "top," "bottom," "inner," and "outer" designate directions in the drawings to which reference is made. The terminology includes the words specifically noted above, derivatives thereof, and words of similar import.

Figure 2A:
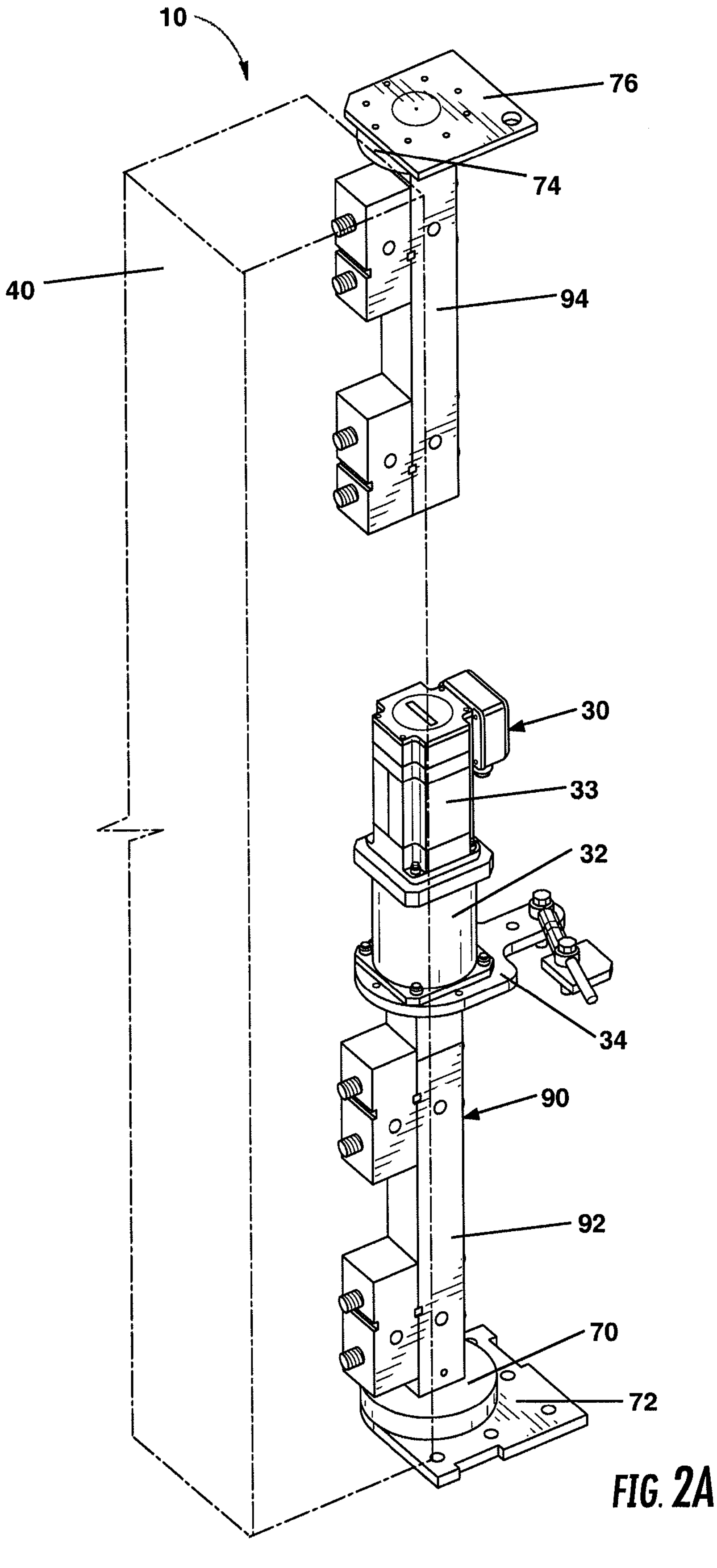
FIG. 2A is a fragmentary view of the motor driven door assembly shown in FIG. 1, showing the door, motor assembly, and hinge assembly.
Figure 2B:
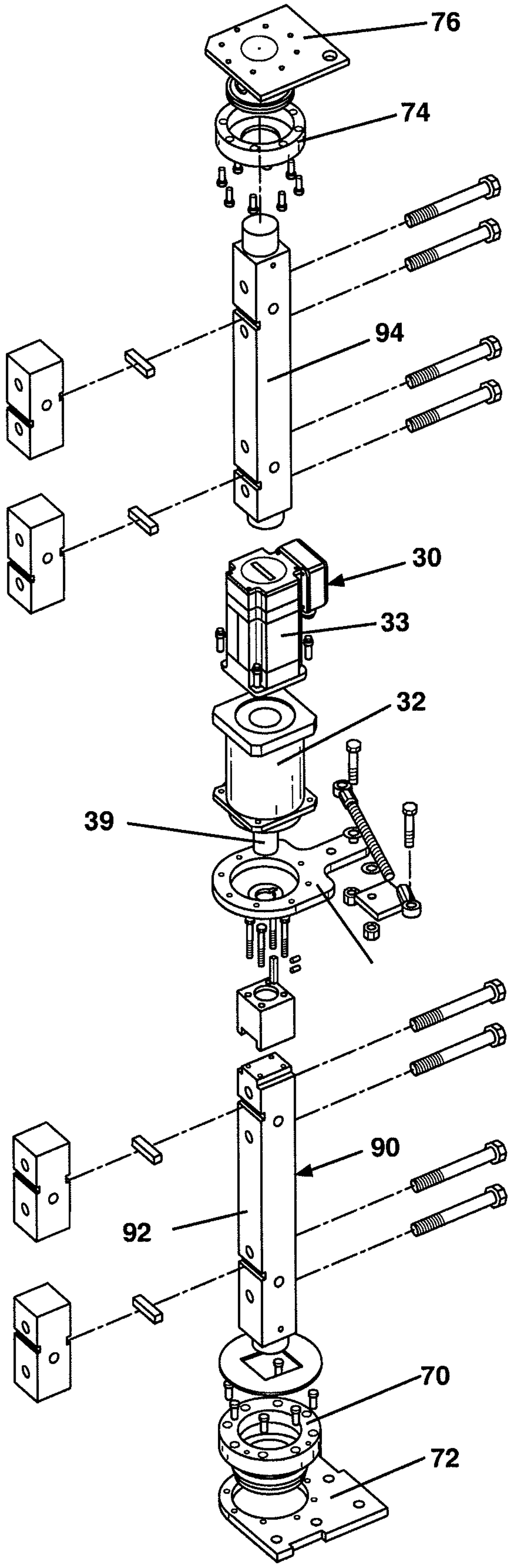
FIG. 2B is an exploded view of the motor assembly and hinge assembly shown in FIG. 2A.
Figure 7A:
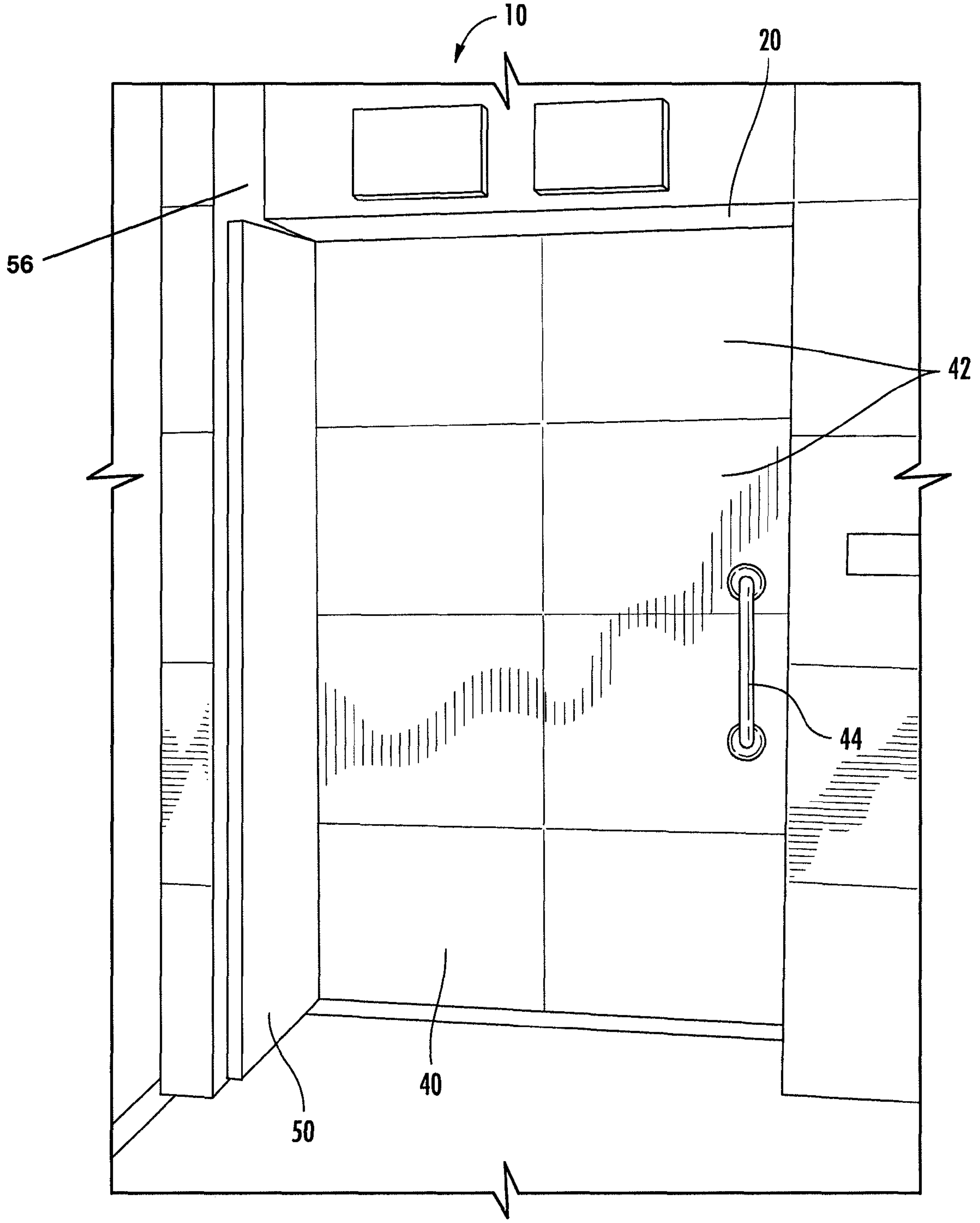
FIG. 7A is a perspective view of the motor driven door assembly shown in FIG. 1 in a closed position from outside of a room.
Figure 7B:
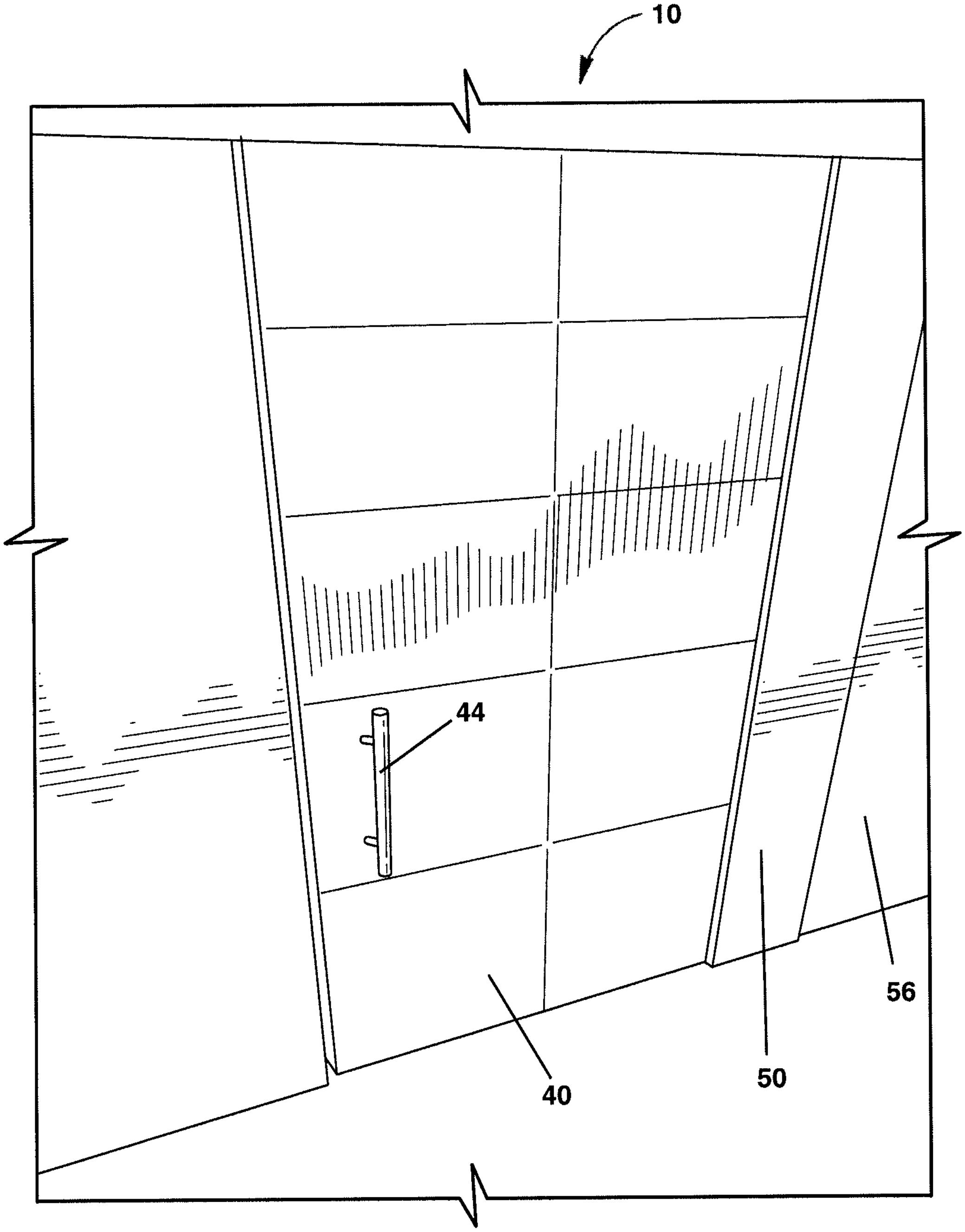
FIG. 7B is a perspective view of the motor drive door assembly shown in FIG. 1 in a closed position from inside of a room.
Figure 11:
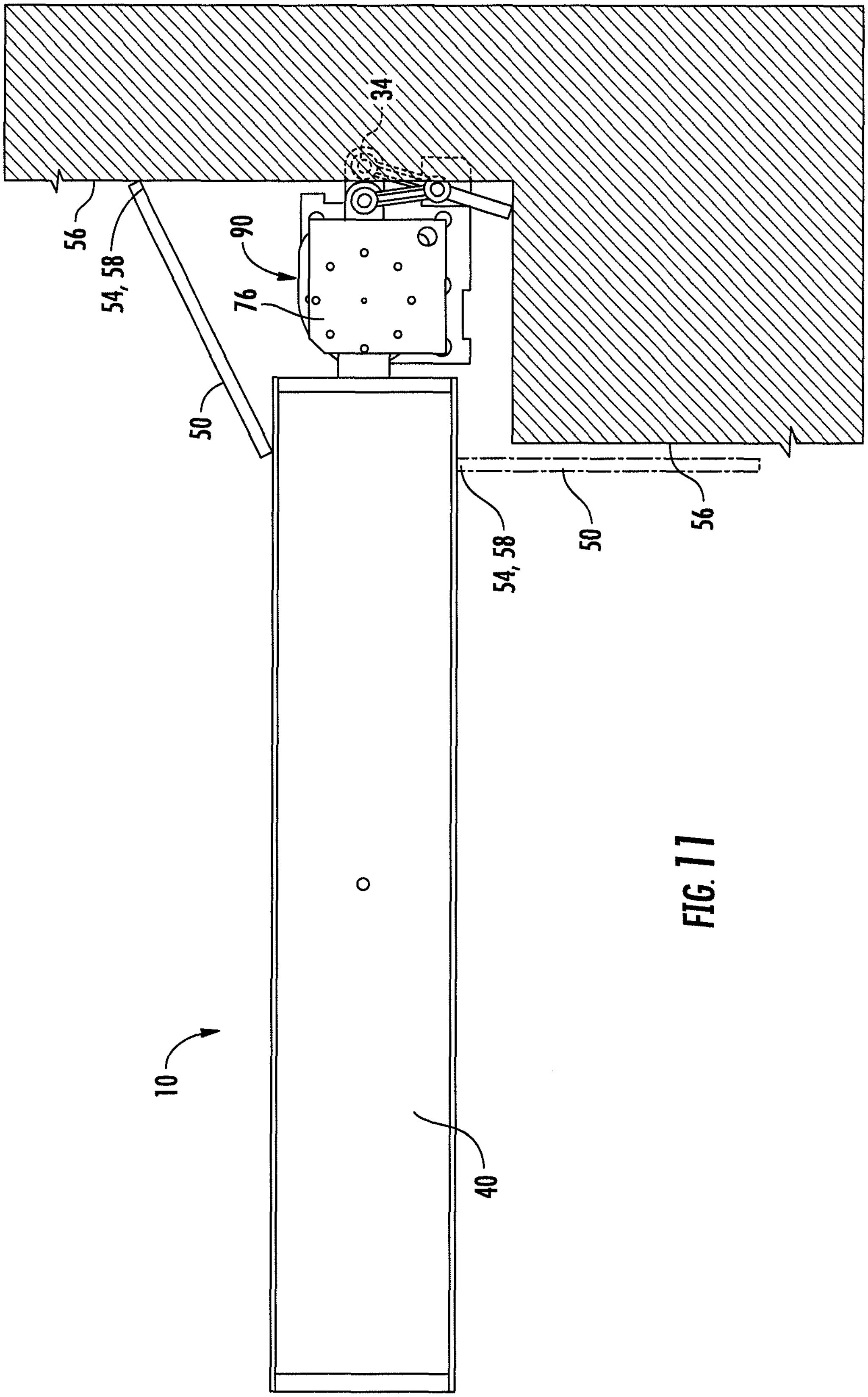
FIG. 11 is a top view of the motor driven door assembly showing a right side door mount and the inside and outside access panels.

FIG. 1 shows an embodiment of the motor driven door assembly 10 according to the present invention in a partially open position. The motor driven door assembly 10 includes a door frame 20, a motor assembly 30 (as shown in FIGS. 2A and 2B) connected to the door frame 20, and a door 40 connected to the motor assembly 30 by a hinge assembly 90. An access panel 50 is arranged adjacent to the door 40 to conceal the motor assembly 30 and hinge assembly 90. As shown by FIG. 11, one end of the access panel 50 may be connected to the door 40 by a hinge 54, while the other end of the access panel 50 is configured to slide along an adjacent wall 56, or vice versa. The hinge 54 that connects the access panel 50 to the door 40 or the adjacent wall 56 can be, for example and without limitation, a spring hinge 58 that applies a force to the access panel 50. As the other end of the access panel 50 is guided by the door's motion to slide along the adjacent wall 56, or in a track (not shown) formed in the adjacent wall 56, the force applied by the spring hinge 58 urges the access panel 50 into contact against the adjacent wall 56. As shown by FIGS. 7A, 7B, and 11, a first access panel 50 can be arranged on one side of the door 40 outside of a room, and a second access panel 50 can be arranged on an opposite side of the door 40 inside of the room, thus completely concealing the motor assembly 30 and hinge assembly 90 on both sides of the door 40. FIGS. 7A and 7B show the motor assembly 30 and hinge assembly 90 connected to a left side of the door 40, while FIG. 11 shows the motor assembly and hinge assembly 90 connected to a right side of the door 40. Preferably, as shown in FIG. 11, the first access panel 50 outside of the room is connected to the door 40 by a spring hinge 58 and slides along an adjacent wall 56, while the second access panel 50 inside of the room is connected to an adjacent wall 56 by a spring hinge 58 and slides along an outer surface of the door 40.

Figure 5:
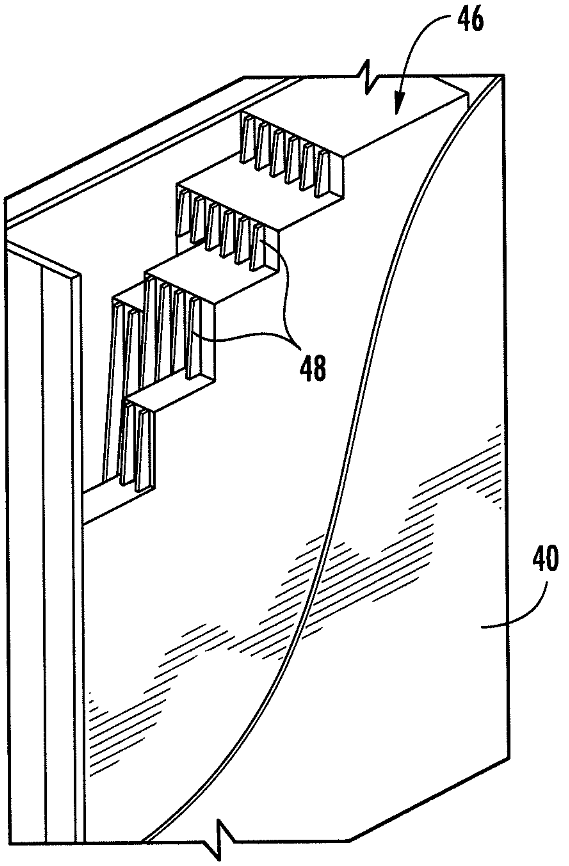
FIG. 5 is a sectional view of the door of the motor driven door assembly shown in FIG. 1.
Figure 6:
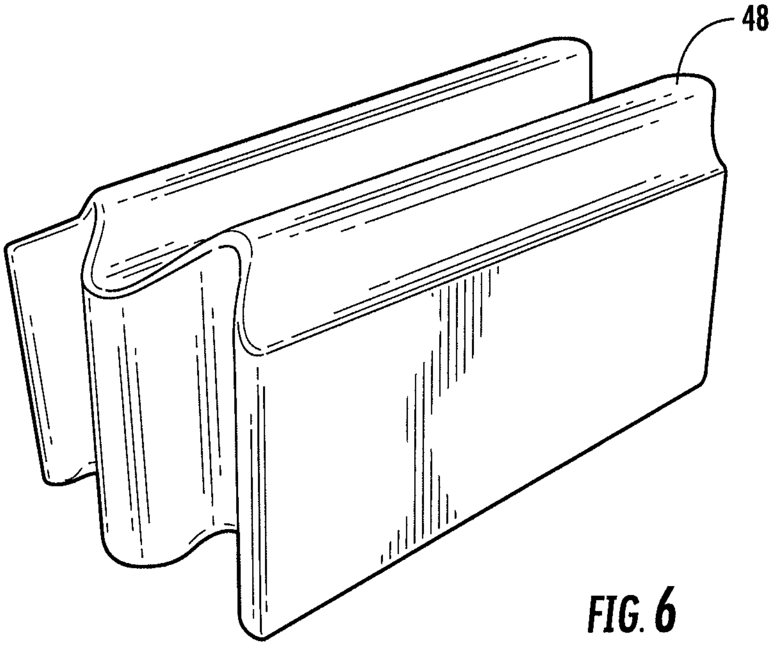
FIG. 6 is a perspective view of the modular core used to construct the door of the motor driven door assembly shown in FIG. 1.

The motor driven door assembly 10 may be manually operated or controlled by a user control system 60. The door 40 may include removable modular panels 42 that form an outer surface of the door 40, which may be easily replaced or exchanged. The removable modular panels 42 may be formed from a variety of materials having different colors, patterns, and finishes. The door 40 may also include a handle 44 for manual operation of the motor driven door assembly 10. As shown in FIGS. 5 and 6, the door may include a core 46 formed of a shielding element 48, such as the modular shielding element 48 shown in FIG. 6. The core 46 may be made from any material having the desired structural and shielding characteristics. The type of shielding element 48 used and the thickness of the core 46 depends on the room in which the motor driven door assembly 10 is installed. Medical radiation treatment rooms usually require doors having a very thick core, for example, 20 inches thick, to provide sufficient shielding. In such circumstances, the removable modular panels 42 also serve to conceal the door thickness for aesthetic purposes and to enhance patient comfort. Although not illustrated in the drawings, the door 40 may also include an illumination element, such as an LED light, to indicate door movement.

Figure 8:
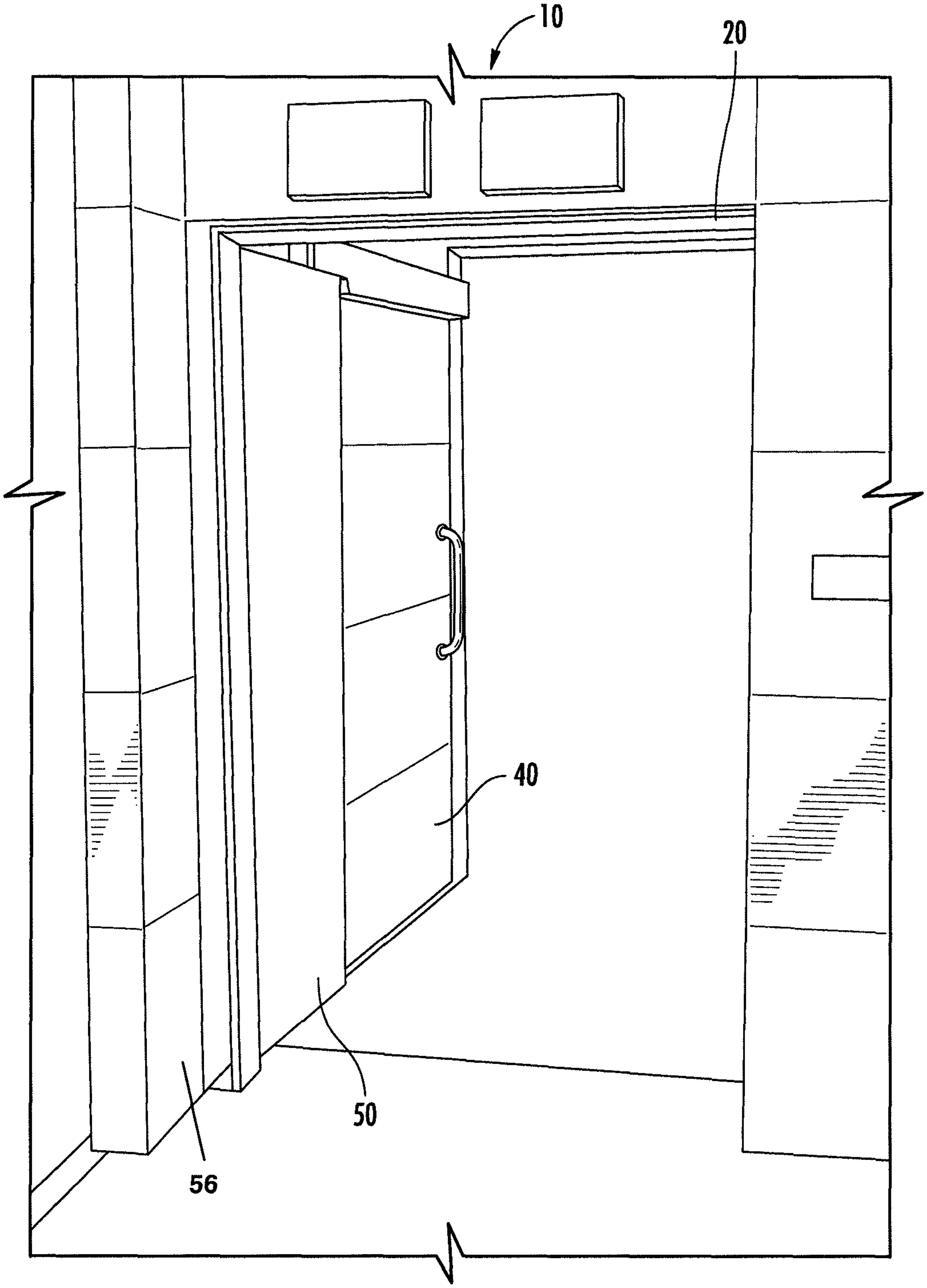
FIG. 8 is a perspective view of the motor driven door assembly shown in FIG. 1 in a fully opened position from outside of a room.

FIGS. 2A and 2B show the motor assembly 30 and hinge assembly 90, which are concealed by the access panels 50 during the entire range of operation of the motor driven door assembly 10 from a closed position (as shown in FIGS. 7A and 7B) to a fully open position (as shown in FIG. 8). Each one of the access panels 50 may be removed to access the motor assembly 30 and hinge assembly 90. This arrangement hides the motor assembly 30 and hinge assembly 90 from view, reduces dust build up, and prevents accidental damage of the motor and hinge assemblies, while allowing easy access to the motor assembly 30 and hinge assembly 90 for servicing or replacement by simply removing the access panel 50.

As shown by FIGS. 2A and 2B, the hinge assembly 90 includes a bottom hinge 92 and a separate top hinge 94 connected to the door 40. Either one or both of the bottom and top hinges 92, 94 can be driven by the motor assembly 30. The motor assembly 30 includes a gearbox 33 and a motor 32 that may be arranged on a support 34, such as a torque plate having a torque arm. The support 34 can be attached to the door frame, an adjacent wall, or any other permanent fixture to secure the motor assembly 30. The motor 32 may be, without limitation, an electric motor wired to an external power source. The motor 32 can include a drive shaft 39 that is integral with the bottom hinge 92 or top hinge 94 of the door 40. Alternatively, the motor 32 may be directly connected to a portion of the bottom hinge 92 or top hinge 94. In the embodiment shown in FIGS. 2A and 2B, the drive shaft 39 of the motor 30 is connected to an axial end of the bottom hinge 92. The bottom hinge 92 is supported by a bottom bearing assembly 70 that carries substantially all of the door's weight, which may be up to 200,000 lbs. Preferably, the bottom bearing assembly 70 includes both radial and thrust bearings. The bottom bearing assembly 70 is securely mounted to the floor on which the motor driven door assembly 10 is installed and is positioned to be flush with the floor. As shown in FIGS. 2A and 2B, the bottom bearing assembly 70 can be connected to a bottom plate 72, which is preferably anchored to the concrete of the floor. Additional floor paneling or tiles can be mounted on top of the concrete to cover the bottom plate 72 and to be flush with the bottom bearing assembly 70 so that it is not exposed. The motor 32 directly rotates the bottom hinge 92 about bottom bearing assembly 70 when the motor 32 is powered to drive the door 40 from the closed position to the open position, or vice versa. The top hinge 94, which is connected to the door 40 above the bottom hinge 92, rotates about a top bearing assembly 74. As shown by FIG. 2B, the top bearing assembly 74 can be connected to a top plate 76, which is mounted to the ceiling or the top of the door frame 20. The top bearing assembly 74 can include only radial bearings, or both radial and thrust bearings. While connecting the motor assembly 30 to the bottom hinge 92 has the advantage of placing the motor assembly 30 at a lower height where it can be easily accessed and serviced, the motor assembly 30 can alternatively be connected to the top hinge 94. For example, when the motor assembly 30 is connected to the top hinge 94, the drive shaft 39 of the motor can extend through the top bearing assembly 74 to connect to an axial end of the top hinge 94. Alternatively, the motor assembly 30 can be mounted in a position between the top and bottom hinges 92, 94 and drive both hinges together.

Figure 10:
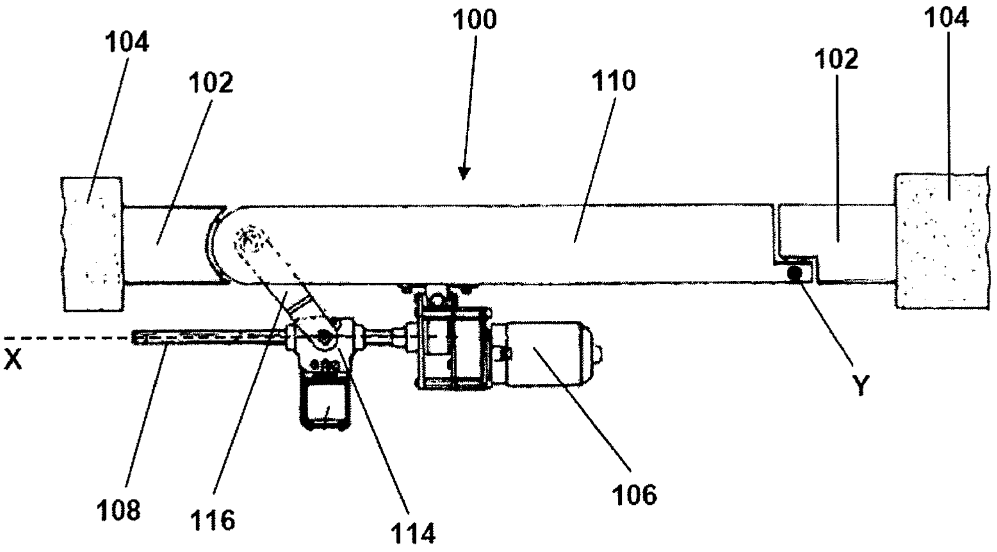
FIG. 10 (PRIOR ART)
FIG. 10 is a top view of a prior art door assembly having a top mounted motor and arm.

The arrangement of the motor assembly 30, hinge assembly 90, and door 40 shown in FIGS. 1, 2A, and 2B is advantageous over the conventional top mounted motor and arm assembly shown in FIG. 10 in several aspects. First, by mounting the motor assembly 30 and hinge assembly 90 alongside the door 40 instead of on top of the door 40, the present arrangement does not cause any loss of headroom and allows easy installation of additional shielding above the door 40. In addition, since the motor 32 directly drives the bottom hinge 92 or top hinge 94 to open and close the door 40, there is no need for an additional arm to transfer the rotational motion of the motor 32 to the door 40. While a conventional top mounted motor has an axis of rotation that is perpendicular to the axis of rotation of the door, the present arrangement aligns the axis of rotation of the motor 32 and the door 40, allowing the door 40 to pivot directly by the motor's drive shaft 39 instead of requiring additional components, which are unsuitable for operating heavy doors such as those used in radiation therapy rooms. Arranging the motor assembly 30 and hinge assembly 90 alongside the door also allows the motor assembly 30, hinge assembly 90, and all wiring to be completely hidden from view by the access panels 50, which is advantageous for both aesthetic and safety reasons. The access panels 50 prevent users' hands or fingers from getting caught behind the door 40 or in the hinge assembly 90 as the door 40 is pivoted. Furthermore, since the weight of the door 40 is supported by the floor mounted bottom bearing assembly 70, the motor driven door assembly 10 can be installed in preexisting rooms, whereas previous drive systems required the motor assembly 30 to be built into the room's floor or ceiling. The present motor driven door assembly 10 can be installed simply by mounting the bottom and top bearing assemblies 70, 74 to the floor, connecting the bottom and top hinges 92, 94 to the door 40, and connecting the support 34 of the motor assembly 30 to the door frame 20. Alternatively, the motor assembly 30 can be mounted to the ceiling as discussed above.

Figure 3:
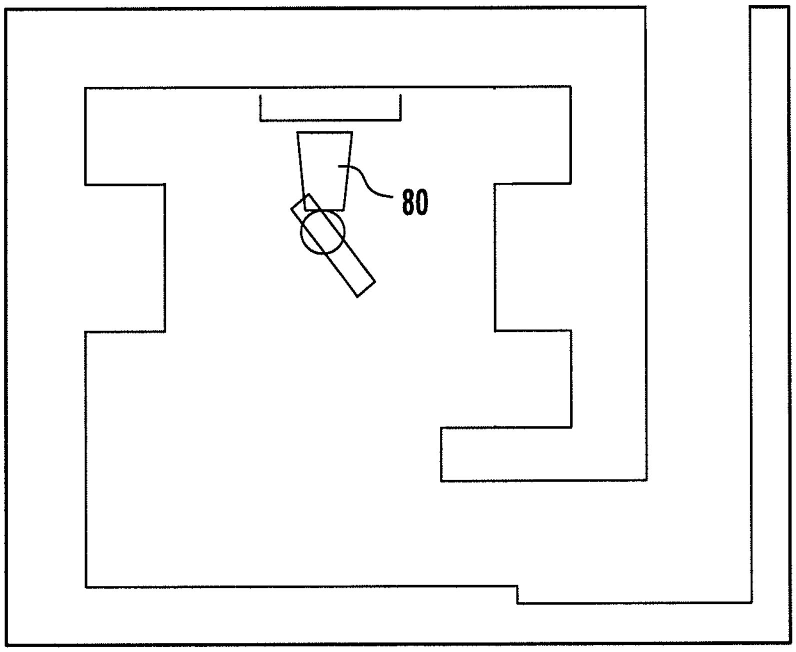
FIG. 3 is a top view of a traditional long-maze entry therapy room.
Figure 4:
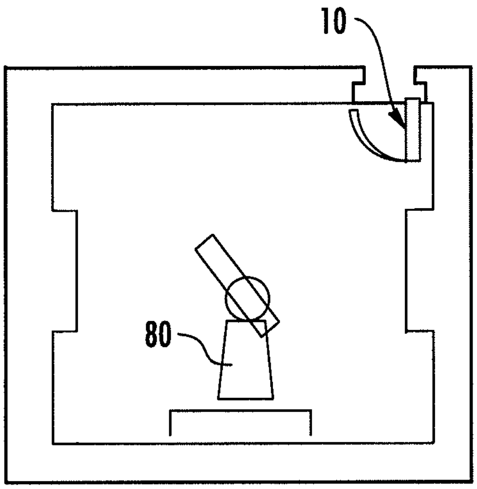
FIG. 4 is a top view of a direct entry therapy room equipped with the motor driven door assembly shown in FIG. 1.

In addition to the advantages discussed above, the present motor driven door assembly 10 also has space saving advantages when installed in a typical medical radiation therapy suite. As shown in FIG. 3, a traditional long-maze entry therapy room requires a large amount of space to be allocated to the maze entry, which features a side wall to capture scatter radiation from the radiation therapy machine 80. In comparison, the direct entry therapy room shown in FIG. 4 utilizing the motor driven door assembly 10 eliminates the additional space required to form a maze entry, thus offering significant space savings and ease of access.

As shown in FIGS. 1, 7A-8, and 11, the angle of the access panels 50 with respect to the door 40 changes as the door 40 moves between the open and closed positions. As shown in FIGS. 7A and 11, when the motor driven door assembly 10 is in a closed position, the access panel 50 on the outside of the room can be positioned substantially perpendicular to the door 40. This access panel 50 can be connected to the door 40 by a spring hinge 58 so that as the motor 32 drives the door 40 towards a partially open position (as shown in FIG. 1), one side of the access panel 50 moves along with the door 40 and the other side of the access panel 50 slides along an adjacent wall 56, thus increasing the angle between the access panel 50 and the door 40. Finally, when the motor driven door assembly 10 is in a fully open position (as shown in FIG. 8), the access panel 50 on the outside of the room can be positioned substantially parallel to the door 40. The inverse is true for the access panel 50 on the inside of the room. As shown in FIGS. 7B and 11, when the motor driven door assembly 10 is in a closed position, the access panel 50 on the inside of the room can be positioned substantially parallel to the door 40. This access panel 50 can be connected to the adjacent wall 56 by a spring hinge 58 so that as the door 40 opens, the access panel 50 rotates with respect to the adjacent wall 56 and slides along an outer surface of the door 40. When the motor driven door assembly 10 is in a fully open position, the access panel 50 on the inside of the room can be positioned substantially perpendicular to the door 40. This arrangement is advantageous, as during the entire operation of the motor driven door assembly 10, the access panels 50 on the outside and inside of the room conceal the motor assembly 30, hinge assembly 90, and all wiring. In addition, the movement of the access panels 50 along the door 40 and wall has a safety feature of preventing an operator's fingers from getting caught in the space adjacent the hinge assembly 90. Furthermore, the access panels 50 conceal the thickness of the door 40, which can be intimidating to a patient entering the treatment suite.

Figure 9:
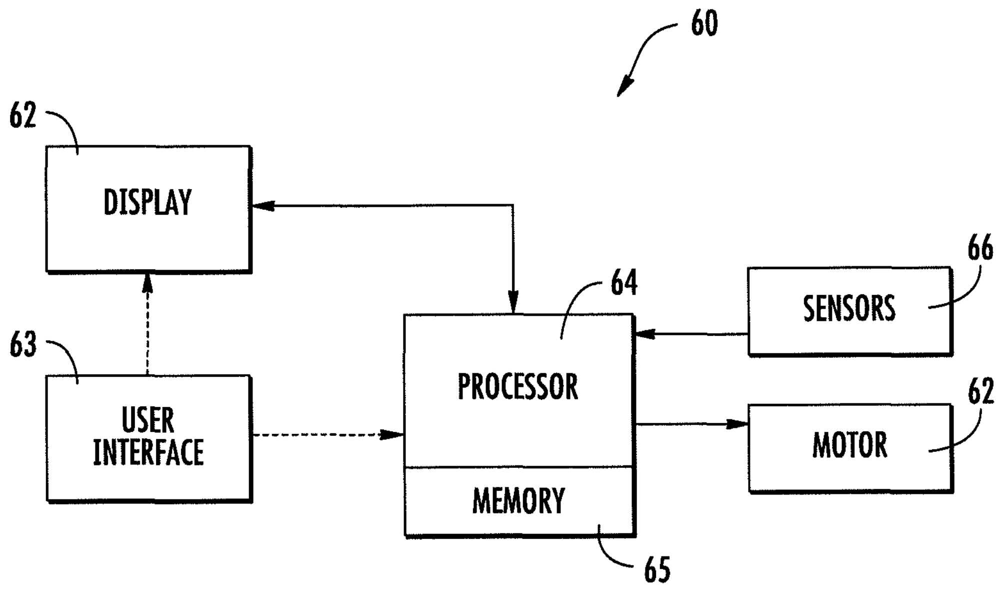
FIG. 9 is a block diagram showing a user control system for the motor driven door assembly shown in FIG. 1.

FIG. 9 is a block diagram showing how the motor driven door assembly 10 may be controlled by the user control system 60 shown in FIG. 1. While the motor driven door assembly 10 is capable of full manual operation, the user control system 60 allows for additional customization, user control, and feedback. As shown in FIG. 9, the user control system 60 includes a display 62. The display 62 may include a touch screen interface to allow a user to input commands and display relevant information to the user. Alternatively, a user interface 63 such as a keyboard can be associated with the display 62 for entering commands. The display 62 is connected to a processor 64 that includes memory 65 for storing relevant information regarding operation of the motor driven door assembly 10. The processor also receives input information from sensors 66 built into the motor driven door assembly 10, which detect a number of parameters such as, without limitation, the position of the door 40, an obstruction between the door 40 and the door frame 20, the number of times the door 40 is opened, and the door 40 speed. Any suitable sensor 66 may be used, including, without limitation, electromagnetic, photoelectric, microwave, or active infrared safety sensors. The processor 64 is also connected to the motor 32 to control operation of the door 40. Although not illustrated in the drawings, the processor 64 may include additional outputs, such as a connection to the radiation therapy machine 80 allowing automatic shutoff of radiation if the door 40 is opened, a connection to an external computer for full reporting of door operation data, or a connection to a remove access device. The processor 64 may be programmed with numerous options, such as, without limitation, setting an electronic door lock code to prevent unauthorized room access, monitoring of door position and stop points, allowing user specified door speed and acceleration, and maintaining a record of door operation data. The user control system 60 may further include a digital auditory messaging system to provide audible door movement annunciation and hazard warnings in different languages. In addition, the user control system 60 may include a transmitter/receiver for sending/receiving information to or from the sensor 66 or motor 32 in a wireless configuration. The user control system 60 is fully customizable, and may be programmed based on a user's individual needs.

While various methods, configurations, and features of the present invention have been described above and shown in the drawings, one of ordinary skill in the art will appreciate from this disclosure that any combination of the above features can be used without departing from the scope of the present invention. It is also recognized by those skilled in the art that changes may be made to the above described methods and embodiments without departing from the broad inventive concept thereof.

What is claimed is:

1. A motor driven shielded door assembly comprising:
- a door frame;
- a motor assembly connected to the door frame and directly connected to a first portion of a door hinge, the door hinge having an axis of rotation that is aligned with an axis of rotation of the motor assembly; and
- a door connected to the door hinge, the door hinge having a second portion supported by a bearing assembly that carries substantially all of the door's weight, the bearing assembly mounted substantially flush to a floor on which the motor driven shielded door assembly is installed;
- wherein the motor assembly directly drives the door hinge to open and close the door via a support that is fixed to the motor assembly, and the support and the motor assembly are arranged between the first portion of the door hinge and the second portion of the door hinge and spaced apart from the first portion of the door hinge and the second portion of the door hinge.

2. The motor driven shielded door assembly of claim 1, wherein the support is fixedly engaged with the door frame or an adjacent wall.

3. The motor driven shielded door assembly of claim 1, wherein the support is a torque plate including a torque arm, and the torque plate transmits torque from the motor assembly to the second portion of the door hinge.

4. The motor driven shielded door assembly of claim 1, wherein a first end of the support is fixed to the motor assembly and a second opposite end of the support is fixed to the door frame or an adjacent wall.

5. A floor mounted motor driven shielded door assembly comprising:
- a door frame;
- a motor assembly connected to the door frame, the motor assembly having a motor with a rotating drive shaft;
- a door having left and right sides, one side of the door having a hinge directly connected to the rotating drive shaft, the door having an axis of rotation that is aligned with an axis of rotation of the drive shaft;
- a bearing assembly that supports a lower end of the hinge and is mounted flush with a floor on which the floor mounted motor driven door assembly is installed; and
- a movable access panel arranged between and connected to one of the door and a side of the door frame to conceal the motor assembly and the hinge during operation of the door, the movable access panel is moves in coordination with door during operation of the door,
- wherein the door is directly driven by the rotating drive shaft as the door pivots about the hinge between a closed position and an open position, without use of any intervening components between the rotating drive shaft and the hinge.

6. A motor driven shielded door assembly, comprising:
- a door frame;
- a motor assembly connected to the door frame and having a motor directly connected to a first portion of a door hinge;
- a door connected to the door hinge, the door hinge having a second portion supported by a bearing assembly that carries substantially all of the door's weight; and
- a user control system electrically connected to the motor assembly to control operation of the door and a sensor configured to relay signals to the user control system, the user control system comprising a display interface configured to receive user input information and display output information, the display interface being connected to a processor that receives signals from the sensor, records data to a memory, and controls the motor assembly;
- wherein the motor directly drives the door hinge to open and close the door via a support that is fixed to the motor assembly, and the support and the motor assembly are arranged between the first portion of the door hinge and the second Portion of the door hinge and are spaced apart from the first portion of the door hinge and the second portion of the door hinge.

7. The motor driven shielded door assembly of claim 6, further comprising an access panel arranged adjacent to the door to conceal the motor assembly and door hinge during operation of the door.

8. The motor driven shielded door assembly of claim 6, wherein the door has a weight of up to about 200,000 lbs.

9. The motor driven shielded door assembly of claim 6, wherein the motor assembly comprises a drive shaft, and the drive shaft is integral with the door hinge.

10. The motor driven shielded door assembly of claim 6, wherein the door hinge includes a bottom hinge and a separate top hinge.

11. The motor driven shielded door assembly of claim 10, wherein the motor is connected to the bottom hinge.

12. The motor driven shielded door assembly of claim 10, wherein the top hinge rotates about a bearing assembly mounted to a ceiling of the door frame.

13. The motor driven shielded door assembly of claim 6, wherein the door has an inner core formed of modular shielding elements and an outer surface formed of removable modular panels.

14. The motor driven shielded door assembly of claim 6, wherein the support is a torque plate including a torque arm, and the torque plate transmits torque from the motor assembly to the second portion of the door hinge.

15. The motor driven shielded door assembly of claim 6, wherein a first end of the support is fixed to the motor assembly and a second opposite end of the support is fixed to the door frame or an adjacent wall.

16. A motor driven door assembly for installation in an existing entryway, the motor driven door assembly comprising:
- a motor having a drive shaft that rotates about a vertical axis;
- a door having a hinge connected to the drive shaft;
- a first access panel arranged adjacent to the door outside of the existing entryway; and
- a second access panel arranged adjacent to the door inside of the existing entryway opposite from the first access panel, wherein the first and second access panels are movable in coordination with movement of the door and conceal the motor and hinge during operation of the door.

17. The motor driven door assembly of claim 16, wherein the first access panel is rotatably connected to the door and configured to slide along an adjacent wall during operation of the door, and the second access panel is rotatably connected to an adjacent wall and configured to slide along the door during operation of the door.

18. The motor driven door assembly of claim 17, wherein the first and second access panels are connected to the door and the adjacent wall, respectively, by spring hinges.

* * * * *